United States Patent
Miyake

(10) Patent No.: US 7,567,201 B2
(45) Date of Patent: Jul. 28, 2009

(54) VEHICLE-INSTALLATION DIRECTION DETECTION APPARATUS ENABLING ACCURATE DETECTION OF TARGET BODY DIRECTIONS IRRESPECTIVE OF VEHICLE SPEED

(75) Inventor: Yasuyuki Miyake, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/265,420

(22) Filed: Nov. 5, 2008

(65) Prior Publication Data

US 2009/0121916 A1    May 14, 2009

(30) Foreign Application Priority Data

Nov. 9, 2007    (JP) .............................. 2007-292156

(51) Int. Cl.
    G01S 13/42    (2006.01)
(52) U.S. Cl. .................... 342/70; 342/133; 342/139; 342/146; 342/147; 342/189; 342/192; 342/195
(58) Field of Classification Search ............. 342/70–72, 342/133, 135, 139, 146–147, 189, 192, 195–196
    See application file for complete search history.

(56) References Cited

U.S. PATENT DOCUMENTS

| | | | | |
|---|---|---|---|---|
| 3,858,206 | A * | 12/1974 | Scheidler et al. | 342/83 |
| 6,317,073 | B1 * | 11/2001 | Tamatsu et al. | 342/70 |
| 6,924,762 | B2 * | 8/2005 | Miyake et al. | 342/70 |
| 7,190,305 | B2 * | 3/2007 | Isaji | 342/70 |
| 7,339,518 | B2 * | 3/2008 | Natsume et al. | 342/70 |
| 7,474,252 | B2 * | 1/2009 | Natsume et al. | 342/70 |
| 7,486,230 | B2 * | 2/2009 | Takano et al. | 342/189 |
| 7,495,605 | B1 * | 2/2009 | Sakamoto et al. | 342/118 |
| 2001/0015698 | A1 * | 8/2001 | Tokoro | 342/70 |
| 2003/0020650 | A1 * | 1/2003 | Chevalier et al. | 342/378 |
| 2003/0052813 | A1 * | 3/2003 | Natsume | 342/70 |
| 2003/0112173 | A1 * | 6/2003 | Seki et al. | 342/70 |
| 2004/0235421 | A1 * | 11/2004 | Matsuoka et al. | 455/63.4 |
| 2006/0007036 | A1 | 1/2006 | Natsume et al. | |
| 2007/0008211 | A1 * | 1/2007 | Yamano et al. | 342/70 |
| 2008/0122681 | A1 * | 5/2008 | Shirakawa | 342/147 |

FOREIGN PATENT DOCUMENTS

| | | |
|---|---|---|
| JP | 2006-047282 | 2/2006 |
| JP | 2006-145251 | 6/2006 |
| JP | 2007240313 A * | 9/2007 |

OTHER PUBLICATIONS

Kikuma, N., "Music Algorithm", Adaptive Signal Processing by Array Antenna, (Nov. 25, 1998), pp. 194-199, with partial English Translation.

* cited by examiner

Primary Examiner—John B Sotomayor
(74) Attorney, Agent, or Firm—Nixon & Vanderhye, PC

(57) ABSTRACT

A vehicle-installed direction detection apparatus is controlled in accordance with the vehicle speed, to detect respective directions of one or more target objects by selectively applying high-resolution detection processing or low-resolution detection processing to received signals obtained from the elements of an array antenna of a radar apparatus, with the selection being determined in accordance with whether the speed attains a predetermined threshold value. The high-resolution detection processing is based on correlation between the received signals, utilizing an null scan type of algorithm such as MUSIC, while the low-resolution detection processing is based for example on digital beam forming.

8 Claims, 6 Drawing Sheets

FIG. 4
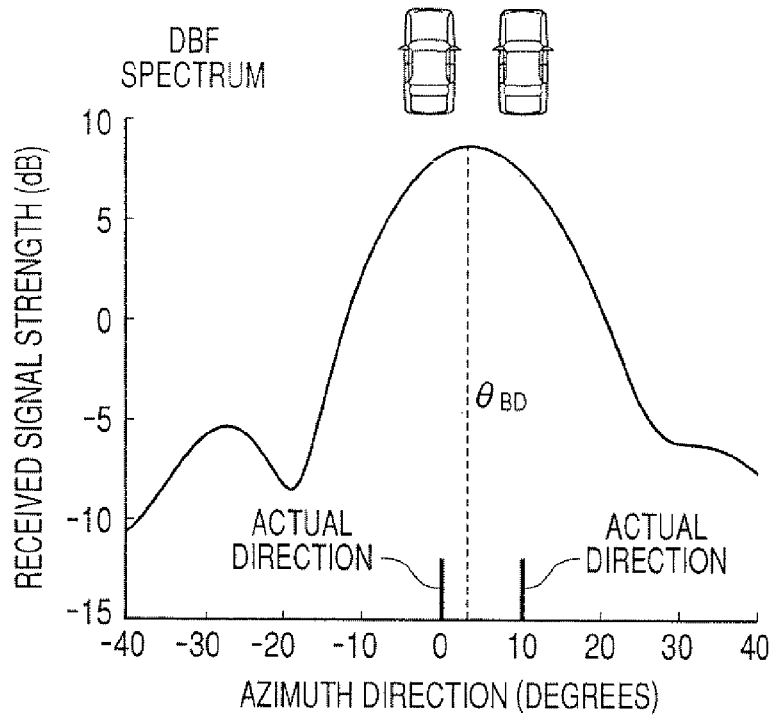
(a)
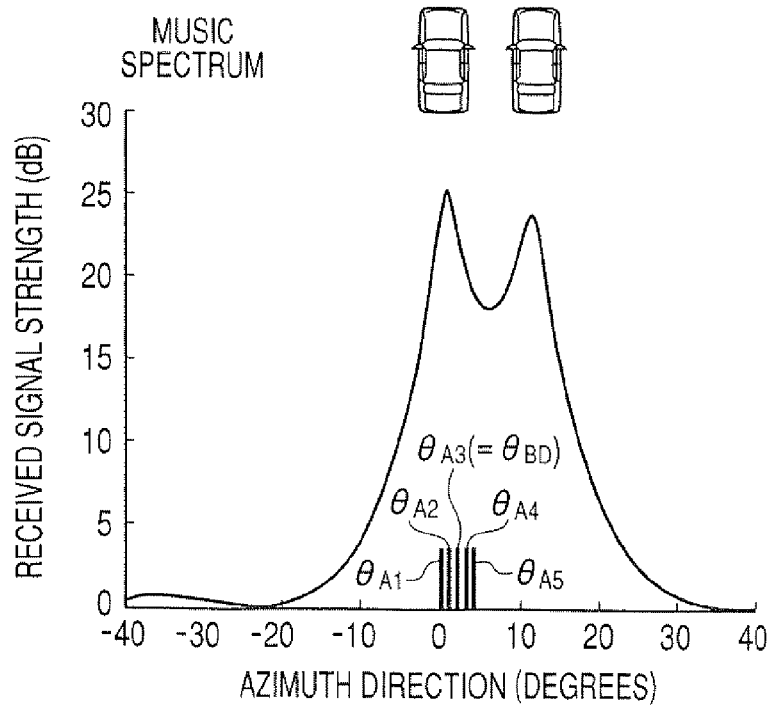
(b)

FIG. 5
(a)
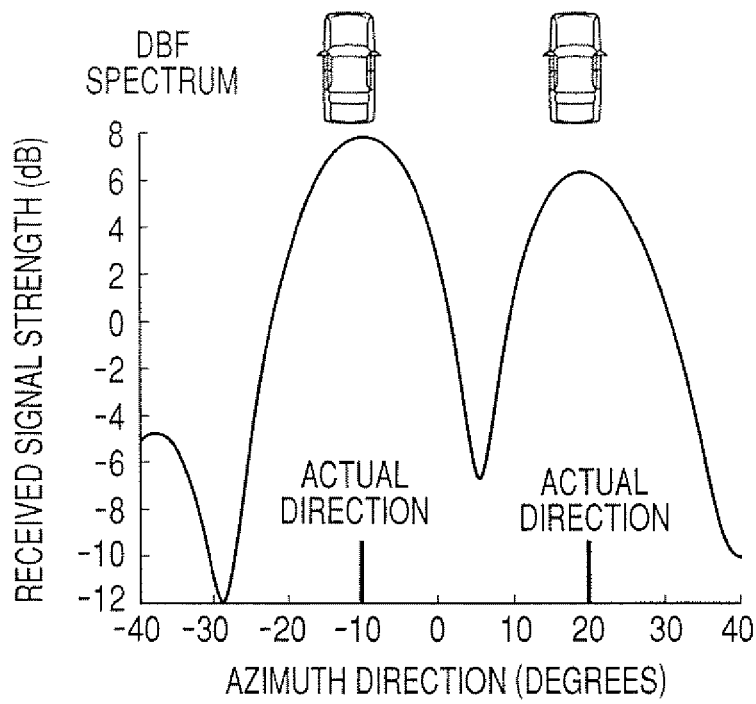
(b)
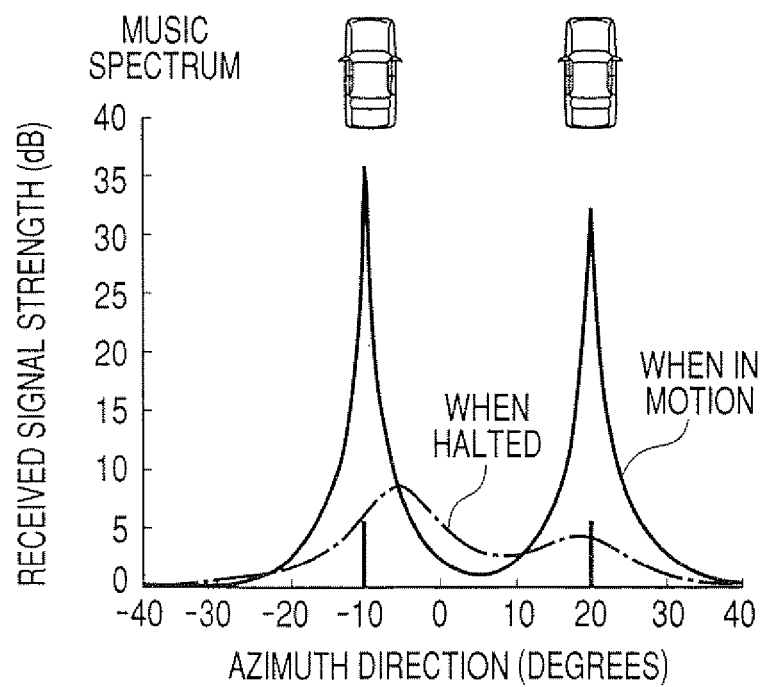

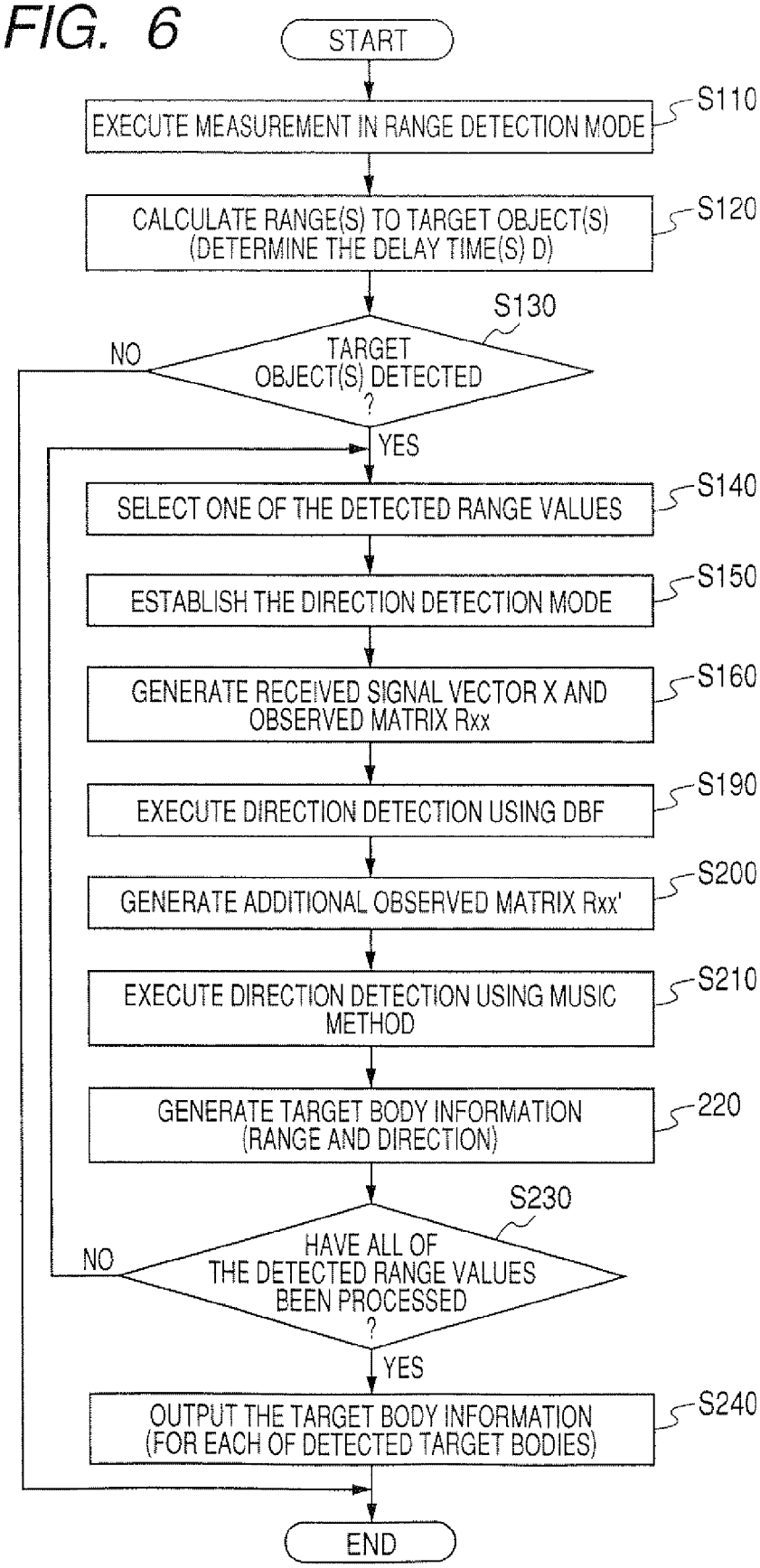

USVEHICLE-INSTALLATION DIRECTION DETECTION APPARATUS ENABLING ACCURATE DETECTION OF TARGET BODY DIRECTIONS IRRESPECTIVE OF VEHICLE SPEED

CROSS-REFERENCE TO RELATED APPLICATIONS

This application is based on and incorporates herein by reference Japanese Patent Application No. 2007-292156 filed on Nov. 9, 2007.

BACKGROUND OF THE INVENTION

1. Field of Application

The present invention relates to a direction detection apparatus which estimates the direction of arrival of electromagnetic waves, based on signals received by an array antenna.

In particular, the invention relates to a direction detection apparatus implemented as a radar apparatus installed on a vehicle, which transmits radar waves and detects the directions of target bodies based on respective directions of arrival of reflected waves from the target bodies.

2. Description of Related Art

Types of radar apparatus which perform direction detection are known, having an array antenna for receiving radar waves, with the array antenna formed of a plurality of antenna elements. Radar waves transmitted from the apparatus are reflected from a target body, and respective received signals resulting from the radar waves are obtained from the antenna elements. The direction of arrival of the radar waves, and hence the direction from the radar apparatus to the target body, is estimated based upon these received signals. Various methods are known for accomplishing this, including beam scan methods such as digital beam forming (DBF) and null scan methods such as MUSIC (MUltiple SIgnal Classification). With a beam scan method, the direction of each target body is estimated by using a corresponding main lobe of the received signal pattern obtained by the array antenna, so that the direction detection resolution is determined by the beam width of the antenna. With a null scan method, since null points of an array antenna having a narrow half-angle are utilized, a high degree of direction detection resolution can be achieved. This is described for example in "Adaptive Signal Processing by Array Antenna" (pages 194-199) published in 1998 by Kagaku Gijutsu Shuppan in Japan, authored by Nobuo Kikuma, referred to as reference document 1 in the following.

In the case of a radar apparatus that is be installed on a vehicle (referred to in the following as the "local vehicle" for brevity of description) for detecting objects such as other vehicles in the environment, the space available for installing the system is extremely limited. The overall size of radar system is mainly determined by the size of the antenna apparatus, so that it is desirable to make the antenna as compact as possible.

Diagram (a) of FIG. 5, illustrates the case of a radar apparatus which utilizes a beam scan method for detecting directions of target bodies based on detecting main lobes of a received signal strength/direction spectrum (DBF spectrum), i.e., a pattern of levels of received signal strength obtained from respective elements of an array antenna of the radar apparatus. With such a method, the problem arises that since the beam width of the array antenna is large, the direction detection resolution is low. Hence it may be impossible for the apparatus to distinguish the respective directions of a plurality of target bodies when the target objects are close together. Moreover if the antenna size must be made small (i.e., the antenna aperture is small), then the beam width of the antenna becomes increased, so that the resolution of direction detection based upon main lobes of the received signal pattern becomes correspondingly lowered.

With a null scan type of algorithm such as MUSIC on the other hand, even if the antenna is made small in size, a high resolution of direction detection can be achieved. However when the difference between the velocities of the target objects is very low or zero, e.g., as occurs when the local vehicle and target objects are halted, it becomes difficult for the apparatus to accurately detect the directions of the target bodies (as illustrated in diagram (b) of FIG. 5).

That is to say, if the target bodies and the local vehicle are stationary, so that there is no difference between the velocities of the target objects, the respective reflected waves arriving from the target bodies will have a strong correlation. Specifically, the difference between the respective phases of the reflected waves from any pair of target objects will not vary with time. With a null scan type of algorithm such as MUSIC, the directions of arrival of incident reflected waves are obtained based on a correlation matrix referred to herein as the observed matrix, which is established based on the received signals from the respective elements of the array antenna. Considering the received signal obtained for each antenna element, when the signal contains components corresponding to a plurality of incident reflected waves (arriving from respectively different directions), and these signal components have a strong correlation, the system will judge that the reflected radar waves are arriving along a single direction, i.e., from a single target body. Hence the respective directions of target bodies cannot be accurately detected by using an algorithm such as MUSIC. Here, "correlation" signifies that the phase difference between a pair of such signal components (constituting a received signal from an antenna element) does not vary with time.

As described in pages 247-263 of reference document 1 above, a method of suppressing the correlation between incident radar waves arriving from different directions is known, whereby a correlation matrix is generated by using spatial averaging. With this method, designating the number of antenna elements of an array antenna as M, and the number of antenna elements of a sub-array as K (<M), respective antenna signals are obtained from sub-arrays that are respectively shifted by one element position, i.e., from a total of N sub-arrays (where N=M−K+1). The required correlation matrix (utilized in estimating the desired directions) is obtained by spatial averaging of correlation matrixes that are derived based on the sets of antenna signals obtained from the respective sub-arrays.

That is to say, the phase relationship between the incident waves arriving from different directions is determined by the reception point of the waves. By deriving respective correlation matrixes that are obtained by successively shifting the reception point, and using averaging of values in these matrixes to derive the values for a final correlation matrix, the effects of correlation between the incident waves upon the final correlation matrix can be suppressed.

However the number of different directions which can be detected is determined by the order of the correlation matrix, i.e., by the number of antenna elements constituting the array antenna. If spatial averaging of respective correlation matrixes obtained from a plurality of successively shifted antenna sub-arrays is utilized as described above, then the problem arises that the number of target bodies whose directions can be separately detected will be reduced.

In particular, if the radar apparatus is to be made compact in size, so that the array antenna must be small, then this becomes a serious problem.

SUMMARY OF THE INVENTION

It is an objective of the present invention to overcome the above problem, by providing a direction detection apparatus for installation on a vehicle, whereby respective directions of target bodies can be reliably detected, and in particular whereby the number of target bodies whose directions can be separately detected concurrently is not reduced when the vehicle on which the apparatus is installed is travelling at a low speed, or is halted.

To achieve the above objectives, according to a first aspect, the invention provides a direction detection apparatus for installation on a vehicle, with the apparatus including a transmitting antenna which transmits electromagnetic waves and an array antenna comprising a plurality of antenna elements, for receiving reflected electromagnetic waves when the transmitted waves are reflected from each of one or more target bodies. When such reflected waves are received, respective received signals are obtained from the antenna elements, and the apparatus detects the direction(s) of the target body or bodies based on the received signals.

The apparatus also includes first direction detection means and second direction detection means. The first direction detection means obtains the target body directions by applying an observed matrix (i.e., a correlation matrix, expressing correlation relationships between the received signals from the antenna elements) to a null scan type of direction detection algorithm.

The second direction detection means detects the target body direction by utilizing a main lobe of the received signal pattern obtained from the array antenna, and has a lower resolution of direction detection than the first direction detection means.

The apparatus further includes selector means, which acquires the velocity at which the vehicle is currently travelling and selects the first direction detection means to perform the direction detection if the velocity exceeds a predetermined threshold value, while if that threshold value is not exceeded, the second direction detection means is selected.

It is possible to set the velocity threshold value at 0 km/h, so that the second direction detection means is selected only while the local vehicle is halted. However it is preferable to set the threshold value at a value greater than zero, to ensure that the selection means will not perform repetitive successive selection operations when the local vehicle is operating in a stop-and-go condition, i.e., is alternately moving at low speed and halting, as a result of congested traffic conditions.

When the local vehicle is travelling slowly or is halted, target bodies whose directions are to be detected will in general be located close to the local vehicle, and in general it is only necessary to detect the directions of such closely-located target bodies during such a condition of travel. For any specific size of target body, the closer the target body, the greater will be its size in relation to the beam width of the direction detection apparatus. Hence, during a condition in which the local vehicle is travelling slowly or is halted, sufficient direction detection accuracy will normally be achieved by using the second direction detection means, in spite of its relatively low resolution of direction detection.

Hence with the present invention, direction detection is usually (that is, when the local vehicle is travelling at a normal speed) performed by using the first direction detection means, which has a high resolution of direction detection. However when the local vehicle is travelling in a condition whereby it is difficult for detection to be achieved by the first direction detection means and sufficient accuracy can be obtained by using the second direction detection means (and only under such a condition), direction detection is performed by using the second direction detection means.

As a result, reliable direction detection can be achieved, irrespective of the travel speed of the vehicle on which the apparatus is installed, and without a reduction (due to the vehicle being halted or moving at a low speed) in the number of target bodies whose directions can be separately distinguished by the apparatus.

According to a second aspect, the invention provides a direction detection apparatus which can achieve a high accuracy of direction detection even when the local vehicle is travelling at a low speed or is halted. With such an apparatus, if the vehicle speed does not exceed the threshold value, so that direction detection by the aforementioned first direction detection means is not selected, then the second direction detection means detects an approximate direction of the target bodies. A third direction detection means then defines a plurality of additional directions, centered on the approximate direction. A quasi-observed matrix is also generated, which is a correlation matrix expressing the correlation relationships between respective presumptive received signals that would be obtained from the antenna elements if reflected waves were to be received by the array antenna after arriving along the additional directions.

The third direction detection means then derives an additional observed matrix (i.e., additional correlation matrix), by adding the quasi-observed matrix to the observed matrix. That additional observed matrix is then used in a direction detection calculation which employs the same detection algorithm as that of the first direction detection means (e.g., MUSIC).

With such a direction detection apparatus, if for example radar waves are arriving at the antenna from two different directions (reflected from two target bodies) and there is strong correlation between the respective reflected radar waves, then if at least one of these arrival directions substantially coincides with one of the additional directions, the correlation (as expressed in the additional matrix) will be effectively destroyed.

Hence, the additional observed matrix can be used with an appropriate direction detection method such as the MUSIC algorithm to reliably detect the respective directions of one or more target bodies from which radar waves are reflected, even if the target bodies are stationary and are close together and located at close range.

With such a direction detection apparatus, even if radar waves are arriving at the antenna from a plurality of different directions (i.e., reflected from a plurality of target bodies) and there is substantial correlation between the radar waves arriving from the different directions, the effect of adding the quasi-observed matrix to the measured matrix is to destroy that correlation. Hence the resultant additional measured matrix can be used with an appropriate direction detection method such as the MUSIC algorithm to reliably detect the respective directions of one or more target bodies from which radar waves are reflected, even if the local vehicle and target bodies are stationary.

Hence from this aspect of the invention, if the velocity of the local vehicle does not exceed the threshold value, direction detection is performed by the third direction detection means using the same estimation algorithm as is used by the first direction detection means, so that accurate detection can be achieved.

According to a third aspect, the invention provides a direction detection apparatus having approximate direction detection means for approximately detecting the direction(s) of one or more target bodies by utilizing DBF (digital beam forming), based on the main lobe of a signal reception pattern of an array antenna. An observed matrix expressing a correlation relationship between the actual received signals from the antenna elements of the array antenna is then generated. In addition, a quasi-observed matrix expressing correlation between a plurality of additional directions as described above is derived, and added to the observed matrix to obtain an additional observed matrix in which the effects of correlation are eliminated. The additional observed matrix is then used in executing a direction detection algorithm capable of a higher detection resolution than the approximate direction detection resolution, such as the MUSIC algorithm. Hence, direction detection can be accurately achieved to a high degree of resolution, irrespective of the velocity of the local vehicle and target objects, by using only a single processing sequence.

BRIEF DESCRIPTION OF THE DRAWINGS

FIG. 4 shows diagrams for use in describing direction detection processing that is executed by the embodiment when the velocity of a vehicle having the radar apparatus installed is below a predetermined value;

FIG. 5 shows diagrams for use in describing a problem which arises with a prior art direction detection method using a radar apparatus; and FIG. 6 is a flow diagram for describing an alternative embodiment having a single processing sequence.

DESCRIPTION OF PREFERRED EMBODIMENTS

Figure 1:
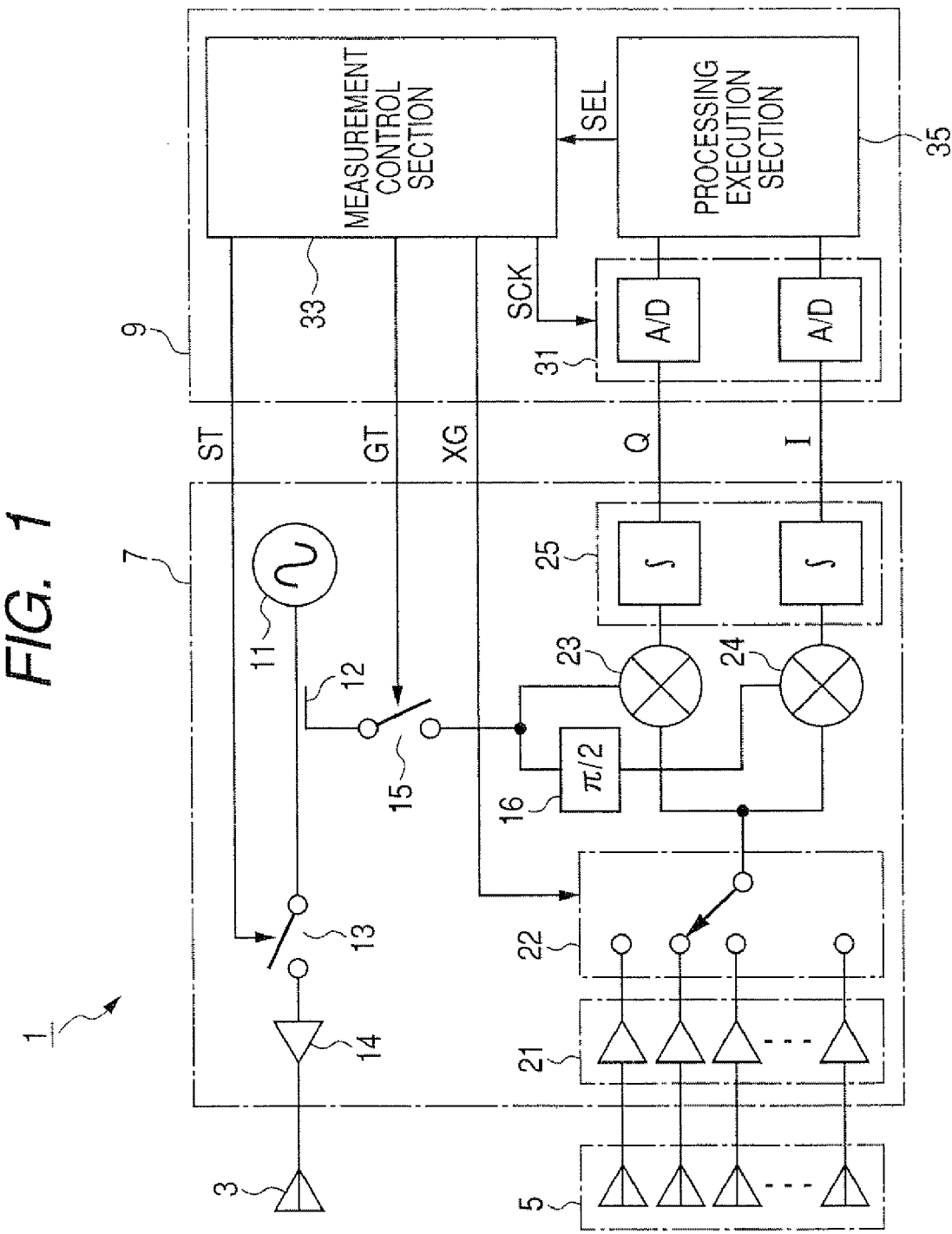
FIG. 1 is a block diagram of an embodiment of a pulse radar apparatus.

FIG. 1 is a block diagram of a pulse radar apparatus 1 which is installed on a local vehicle, and which detects respective directions of other vehicles, pedestrians, obstacles, etc., in the environment. As shown in FIG. 1, the pulse radar apparatus 1 includes a transmitting antenna 3, a receiving antenna 5, a RF amplifier circuit section 7, and a signal processing section 9. The transmitting antenna 3 transmits radar waves, and the receiving antenna 5 receives radar waves that have been reflected from a target body after being transmitted from the transmitting antenna 3. The RF amplifier circuit section 7 generates a transmission signal as a series of high-frequency pulses, which are supplied to the transmitting antenna 3, and also processes received signals that are supplied from the receiving antenna 5. The signal processing section 9 controls the operation of the RF amplifier circuit section 7, and detects information (referred to in the following as target body information) relating to target bodies from which radar waves are reflected, with the target body information being derived from the received signals. The transmitting antenna 3 is a patch antenna. The receiving antenna 5 is a linear array antenna having K antenna elements (where K is a plural integer) that are respective patch antennas, arrayed in parallel and equidistant, with a spacing d between adjacent antenna elements.

RF Circuit Section

The RF amplifier circuit section 7 includes an oscillator 11, a splitter 12, a transmission switch 13, a amplifier 14, a local oscillator signal switch 15 and a phase shift circuit 16. The oscillator 11 generates a high-frequency signal in the millimeter waveband (with this embodiment, in the 26 GHz band). The splitter 12 separates the path of the high-frequency signal from the oscillator 11 into that of a main high-frequency signal and a local oscillator signal. The transmission switch 13 is controlled by timing pulses ST supplied from the signal processing section 9, to supply successive high-frequency signal pulses to the transmitting antenna 3 via the amplifier 14, having a fixed pulse width, with the pulse width being determined by the timing signal ST. The amplifier 14 amplifies the high-frequency signal pulses before supplying these to the transmitting antenna 3 as the transmission signal.

The local oscillator signal switch 15 supplies the local oscillator signal to subsequent stages during fixed-duration intervals that are determined by a gate signal, which is formed by delaying the timing signal ST. The phase shift circuit 16 applies a 90° ($\pi/2$ radians) phase shift to the output signal from the local oscillator signal switch 15.

The RF amplifier circuit section 7 further includes an amplifier section 21, a receiving switch 22, mixers 23 and 24 and a detection section 25. The amplifier section 21 consists of a set of amplifiers which respectively amplify the received signals which are supplied from the antenna elements of the receiving antenna 5. The receiving switch 22 is controlled by a selector signal SG produced by the signal processing section 9, to select the received signal from one of the antenna elements of the receiving antenna 5, and supplies the selected received signal to a succeeding stage. The mixer 23 mixes the received signal selected by the receiving switch 22 with the local oscillator signal from the local oscillator signal switch 15, while the mixer 24 mixes the received signal selected by the receiving switch 22 with the local oscillator signal after that signal has been phase-shifted by 90° by the phase shift circuit 16. The detection section 25 is formed of a pair of integrators which respectively integrate the output signals from the mixers 23 and 24.

The output signal from the detection section 25 that is obtained by integrating the output signal from the mixer 23 will be referred to as the Q signal and the signal obtained by integrating the output signal from the mixer 24 as the I signal.

Signal Processing Section

The signal processing section 9 is made up of an A/D converter section 31, a measurement control section 33 and a processing execution section 35. The A/D converter section 31 consists of a pair of A/D converters which respectively perform A/D conversion of the Q and I signals from the RF amplifier circuit section 7. In addition to the aforementioned signals ST, GT and XG, the measurement control section 33 generates a sampling clock signal SCK for controlling the A/D converter section 31. The processing execution section 35 is a usual type of microcomputer, which executes target body range and direction detection by calculations based on target body information that is acquired as digital data, obtained by sampling of received signals from the antenna elements of the antenna 5, performed by the A/D converter section 31.

Measurement Control Section

The measurement control section 33 is configured to operate in either a range detection mode in which the distance to a target body or bodies is/are measured or in a direction detection mode in which the direction(s) of one or more target bodies are obtained, with the operating mode being determined by a selection signal SEL that is supplied from the processing execution section 35. The term "direction" as used herein in describing specific embodiments is to be understood as signifying an azimuth direction, measured with respect to the direction of forward motion of the local vehicle. However it will be understood that the principles of the invention are not limited to azimuth direction detection.

Range Detection Mode

When the range detection mode is selected by the selection signal SEL, the measurement control section 33 generates the changeover signal XG such a plurality of radar wave pulses are successively transmitted during each of successive intervals referred to in the following as reception periods. The signals obtained from resultant received radar waves are detected after a delay time has elapsed following each transmitted pulse, with the delay time being successively increased during a reception period as illustrated in diagram (a) of FIG. 2, and with the receiving switch 22 being controlled to fixedly select the received signal from a specific one of the antenna elements of the receiving antenna 5 for the duration of the reception period. This is performed successively for each of the K antenna elements, i.e., as a cyclically repeated sequence.

Specifically, designating Rm as the maximum value of range that is to be detected by the apparatus, Ta as a measurement interval, which is the time required for radar waves to travel to and return from a target body that is located at the maximum range Rm (where Ta=2 Rm/C, C being the speed of light), and designating the pulse width of the transmitted radar wave pulses (which is also the pulse width of the timing signal ST and of the gate signal GT) as $\tau$, (=Ta/M, where M is a plural integer), then in each reception period (M×Ta), a pulse of the timing signal ST is generated at the start of each measurement interval Ta, i.e., is outputted M times in succession in a reception period. As shown, the period Ts of the sampling clock signal SCK is identical to the measurement interval Ta.

Each time the timing signal ST is outputted, the gate signal GT is outputted after a delay interval D. The delay interval D is increased by $\tau$ each time that it is outputted (i.e., D=0, $\tau$, 2$\tau$, 3$\tau$, . . . (M−1)$\tau$). Each amount of increase of the delay time D is assumed here to correspond to the pulse width $\tau$, however the invention is not limited to this, and the amount of increase could be made smaller than $\tau$. The smaller the amounts of increase in D, the greater will be the range resolution.

Figure 2:
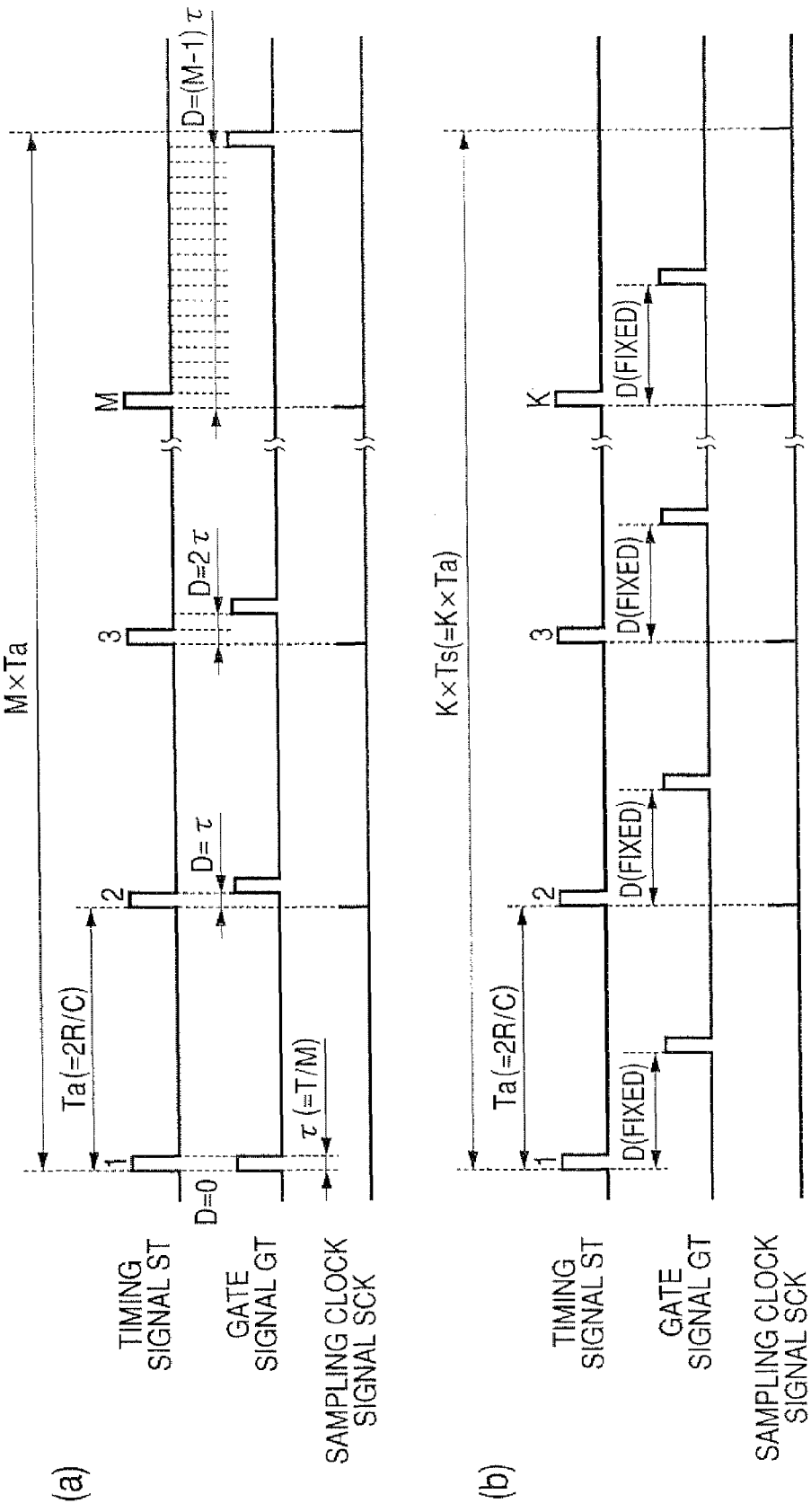
FIG. 2 is a timing diagram for use in describing the operation control of a RF circuit section by a measurement control section in the embodiment.

Thus as shown in diagram (a) in FIG. 2, each time a pulse of radar waves is transmitted (each time that the timing signal ST is outputted), the gate signal GT is outputted after a delay interval has elapsed following the timing signal ST, and the mixers 23, 24 and the detection section 25 thereby detect the received signal obtained by an antenna elements of the receiving antenna 5. The delay interval successively increases at each transmitted pulse, i.e., with the timings of the gate signal GT successively scanning along the time axis within the range of the measurement interval Ta, until the end of the reception period (M×Ta). The timings of the gate signal GT at which high correlation occurs between the transmitted and received signals, i.e., at which the amplitudes of the output signals from the mixers 23, 24 (as represented by the sample values obtained by the A/D converter section 31) exceed a predetermined level, are each detected as the time required for the radar waves to travel to and from a specific target body, or to and from a plurality of target objects that are each located at a similar range. This is known as the matched filter method.

Direction Detection Mode

The measurement control section 33 is configured such that if the direction detection mode is selected by the selection signal SEL, then in synchronism with outputting the timing signal ST, the measurement control section 33 outputs the switching signal SG for controlling the receiving switch 22 to select the received signals from successive ones of the antenna elements. Specifically, the signal XG from the measurement control section 33 selects the received signal from one of the antenna elements during a measurement intervals Ta, with this performed successively for each of the K antenna elements during each reception period (K×Ta), as shown in diagram (b) of FIG. 2.

Each time the timing signal ST is outputted, the gate signal GT is then outputted after a fixed delay interval D has elapsed, with the value of D being set by the processing execution section 35.

Reflected radar waves arriving from a range that is determined by the magnitude of the delay interval D are received by the respective antenna elements of the receiving antenna 5. In each measurement interval Ta, the Q and I signals that are obtained based on the received signal from a specific antenna element are supplied to the signal processing section 9.

The measurement control section 33 is configured such that both in the range detection mode and in the direction detection mode, the sampling clock signal SCK (whose periods Ts are synchronized with the periods Ta of the timing signal ST) is generated such that the integration period of the detection section 25 extends from the timing at which a pulse of the timing signal ST is outputted up to the end of the succeeding measurement period Ta.

Hence, if the range of a target body has been estimated by using the range detection mode, the direction of that target object can then be estimated by using the direction detection mode, employing the range information to set the value of the delay interval D.

Target Body Detection Processing

Figure 3:
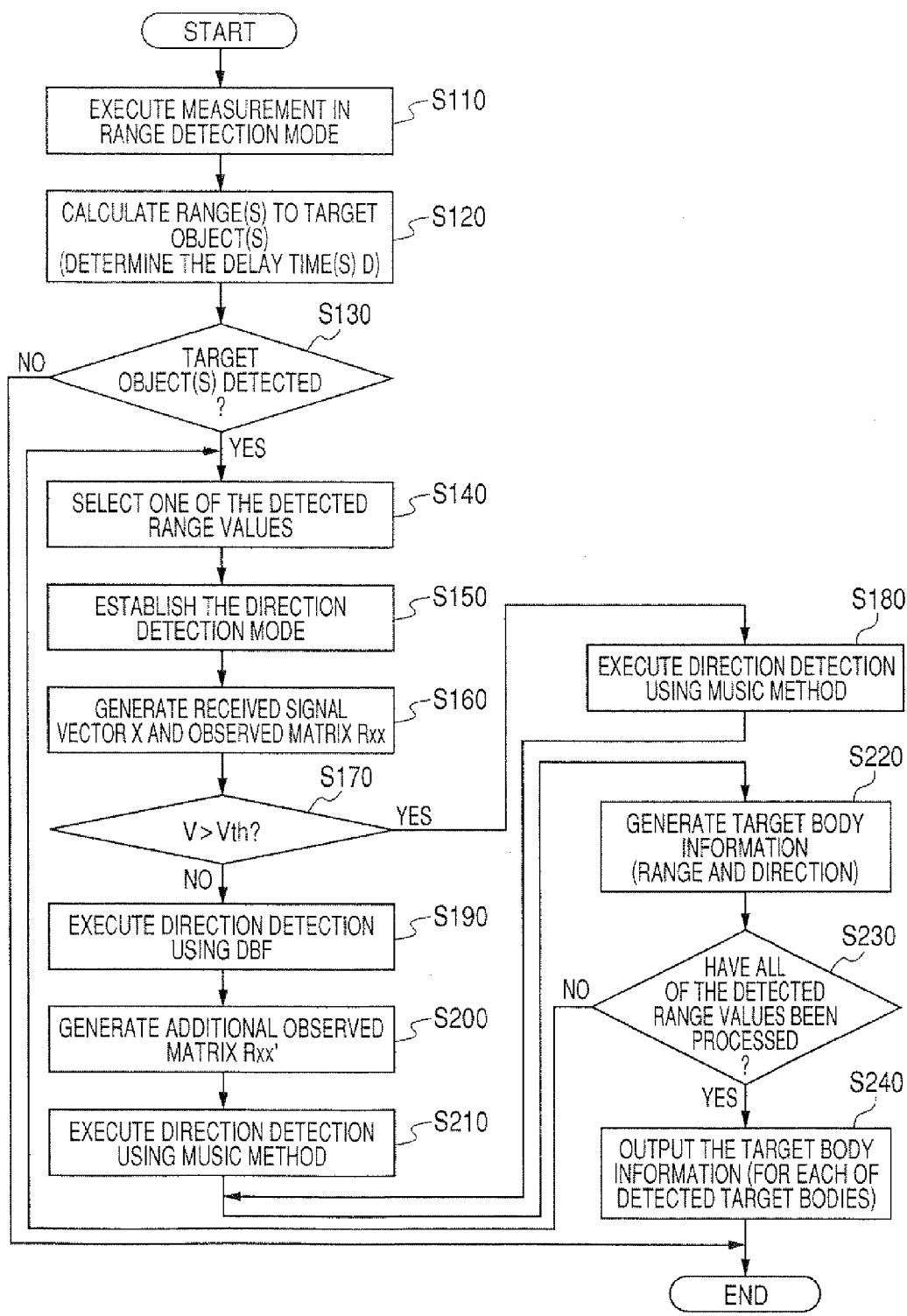
FIG. 3 is a flow diagram of processing performed for target body detection, executed by a processing execution section of the embodiment.

The target body detection processing that is executed by the processing execution section 35 will be described referring to the flow diagram of FIG. 3. This processing is executed repetitively at predetermined fixed time intervals. When the processing is started, then firstly (step S110) the measurement control section 33 is set in the range detection mode, then sampling (A/D conversion) of the I and Q signals is performed. Next in step S120, the resultant sampled data are processed to obtain the range(s) of one or more target bodies from which the radar waves have been reflected.

Specifically, based on M pairs of sampled data values (referred to in the following simply as the I values and Q values) obtained from the I and Q signals respectively, corresponding to M successive occurrences of the gate signal GT (scanning within the measurement range Ta), each of the timings (values of delay time D) of the gate signal GT are obtained at which the received signal amplitudes (calculated from the pairs of Q and I values obtained from the received signals of the respective antenna elements) exceed the predetermined threshold value. The range R to a target body (C×D/2, where C is the speed of light) is calculated based on the time D as being the time required for the radar waves to travel to and from that target body. If there are a plurality of timings of the gate signal GT for which the above threshold value is exceeded, signifying that the respective ranges of a plurality of target objects have been detected, then respective values of R corresponding to these timings of the gate signal GT are calculated.

Next in step S130, a decision is made as to whether one or more target bodies located at respectively different ranges has been detected as a result of operation in the range detection mode (i.e., at least one value of range R of a target body has been calculated based on a delay time D). If no target body has been detected, then the processing is ended.

However if it is found in step S130 that one or more target bodies has been detected, then S140 is executed, in which one of the ranges R obtained in the preceding step S130 is selected (i.e., a range value which has not yet been processed in steps S150 to S240, described hereinafter). Next in step S150, the delay interval(s) D and corresponding range(s) R selected by the measurement control section 33 is/are notified to the measurement control section 33, and the measurement control section 33 is then set in the direction detection mode of operation, with sampling of the Q and I signals from the RF amplifier circuit section 7 being performed.

Next in step S160, based on K pairs of Q and I values that have been successively obtained from the respective received signals of the K antenna elements of the receiving antenna 5 while operating in the direction detection mode, a K-dimensional received signal vector X represented by expression (1) below is generated. The K elements of the vector X are complex values respectively corresponding to the K received signals from the antenna elements, each formed of a Q value as the imaginary part and a corresponding I value as the real part, with the array sequence corresponding to the array sequence of the antenna elements. Using that received signal vector X, an observed matrix Rxx is generated as a correlation matrix having K rows and K columns (expression (2) below).

$$X = (x_1, x_2, \ldots, x_K)^T \quad (1)$$

$$Rxx = XX^H \quad (2)$$

In the above, T denotes the vector transpose, H denotes the complex conjugate transpose.

Next in step S170, the velocity V of the local vehicle is acquired, and a decision is made as to whether the velocity V exceeds a predetermined threshold value Vth (which with this embodiment is 10 km/h). If the threshold value is exceeded (YES decision) then S180 is executed, in which direction estimation using the MUSIC algorithm is performed. Operation then proceeds to step S220.

Specifically, with MUSIC direction estimation, $\lambda_1 \sim \lambda_k$ (where $\lambda_1 \geq \lambda_2 \geq \ldots \lambda_k$) are obtained as respective eigenvalues of the observed matrix Rxx derived in step S160, and the number of incident waves (i., number of directions from which reflected waves are being received), designated as L, is estimated based on the number of eigenvalues that exceed a predetermined noise power level. An eigenvector e1~ek corresponding to the eigenvalues $\lambda_1 \sim \lambda_k$ is also calculated.

A noise eigenvector $E_N$ (defined by equation (3) below) is derived, which is an eigenvector corresponding to the (K-L) eigenvalues that are below the thermal noise power level. In addition, an evaluation function $P_{MU(\theta)}$ is obtained as expressed by equation (4) below, where θ represents a direction (angular value) measured with respect to the direction of forward motion of the local vehicle as a reference, and a (θ) expresses the complex response of the receiving antenna 5 with respect to the direction θ.

$$E_N = (e_{L+1}, e_{L+2}, \ldots, e_K) \quad (3)$$

$$P_{MU}(\theta) = \frac{a^H(\theta)a(\theta)}{a^H(\theta)E_N E_N^H a(\theta)} \quad (4)$$

In the angular spectrum (MUSIC spectrum) that is obtained by applying the evaluation function $P_{MU(\theta)}$ to a range of (angular values of) direction, sharp peaks occur at the angular values which correspond to directions of arrival of incident radar waves (reflected from respective target bodies). Hence, the estimated arrival directions $\theta_1$-$\theta_L$ of the reflected waves are detected as respective peaks in the MUSIC spectrum.

However if a NO decision is reached in step S170 above, then S190 is executed, in which direction estimation is performed by using DBF (digital beam forming). With DBF direction estimation, the eigenvalues ($x_1$-$x_k$) of the received signal vector obtained in step S160 are used to perform beam forming by applying FFT (Fast Fourier Transform) processing. The approximate direction $\theta_{DB}$ of a target body (or an approximate direction of a plurality of target bodies which are located close to one another) is thereby obtained as the direction of a main lobe of the received signal pattern of the array antenna, i.e., the detected approximate direction corresponds to the highest level of received signal power.

Next in step S200, a set of N additional directions $\theta_{A1} \sim \theta_{AN}$ are defined (where N is a fixed plural integer), which are centered on the approximate direction $\theta_{DB}$ that was obtained in step S190 (see diagram (b) of FIG. 4).

A quasi-received signal vector $X_{Ai}$ (i=1, 2, . . . , N) is then derived based on these N additional directions, as expressed by equation (5) below, in which d is the spacing between adjacent antenna elements in the receiving antenna 5, and λ is the wavelength of the transmitted radar waves. Each quasi-received signal vector corresponds to a set of K presumptive received signals which would be respectively obtained from the K antenna elements (i.e., during a reception interval (k×Ta) shown in diagram (a) of FIG. 2) if radar waves were received along the corresponding one of the additional directions $\theta_{Ai}$.

More specifically, each quasi-received signal vector, corresponding to a specific additional direction, expresses the sample values that would be obtained by the A/D converter section 31 expressing the Q and I component pairs of the set of K presumptive received signals which correspond to that specific additional direction.

The N quasi-received signal vectors $X_{Ai}$ are then used to calculate N corresponding correlation matrixes $X_{Ai}X_{Ai}^H$ and these are summed and multiplied by a predetermined coefficient α, to obtain a matrix referred to in the following as a quasi-observed matrix. The observed matrix $R_{xx}$ that was generated in step S160 is then added to this quasi-observed matrix, as shown by equation (6) below, to generate an additional observed matrix $R_{xx}'$.

$$X_{Ai} = (1, e^{j\mu_i}, e^{2j\mu_i}, \ldots, e^{(K-1)j\mu_i})^T \quad (5)$$

where $\mu_i = (2\pi d/\lambda)\sin \theta_{Ai}$ $$Rxx' = Rxx + \alpha \sum_{i=1}^{N} X_{Ai} X_{Ai}^{H} \qquad (6)$$

The value of α in equation (6) is set in the range 0<α<0.1.

Next in step S210, direction detection using the MUSIC algorithm is performed in the same way as for step S180, but with the additional observed matrix $R_{xx}'$ obtained in step S200 being used in place of the observed matrix $R_{xx}$. Step S220 is then executed. The direction(s) of one or target bodies located at the selected range R is/are thereby obtained from the MUSIC spectrum.

In step S220, information expressing the range R that was selected in step S140 and information expressing the corresponding direction(s) obtained using the MUSIC spectrum calculated in step S180 or in S210, are stored, as an item (or items) of target body information (i.e., each item being a linked combination of range/direction information).

Next in step S230, a decision is made as to whether the processing of steps S140 to S220 has been executed for each of the (one or more) range values R that were calculated in step S120. If any range value R has not yet been processed, operation returns to step S140, to repeat the processing described above. If all of the range values R have been processed then S240 is executed, in which all of the items of target body information that have been stored in executions of step S220 are read out and supplied to an external apparatus of the vehicle. The processing is then ended.

The number and spacings of the additional directions (e.g., $\theta_{A1} \sim \theta_{A5}$ in diagram (b) of FIG. 5) will be determined based on particular system requirements. For example, if the spacing between adjacent additional directions is made large, then there may be a danger of insufficient suppression of correlation, and it may be necessary to increase the value of the coefficient α of equation (6) accordingly. The range of the additional directions is preferably limited such as not to exceed a known range of possible directions of arrival of reflected waves from target objects.

The above embodiment relates to the contents of the appended claims as follows. The processing executed in step S180 corresponds to a first direction detection means, the processing of step S190 corresponds to a second direction detection means and to an approximate direction detection means, the processing of step S170 corresponds to a selector means, the processing of step S200 corresponds to a quasi-observed matrix generating means, and the processing of step S210 corresponds to a third direction detection means and to a fine direction detection means.

Effects Obtained by Invention

With the first embodiment described above, if the velocity V of the local vehicle is greater than a threshold value Vth, then direction estimation is performed by the MUSIC method, using an observed matrix $R_{xx}$ which is generated based on measurement results, i.e., on received signals obtained by respective elements of the array antenna. If the velocity V does not attain the threshold value Vth (so that there may be a strong correlation between reflected radar waves from a plurality of separate target bodies) then firstly an approximate measurement is performed using DBF (step S190 above) to obtain an approximate direction of the target bodies, then a quasi-measurement vector (quasi-cross correlation vector) $X_{Ai}$ id derived based on the approximate direction measurement results. The quasi-measurement vector $X_{Ai}$ is then used to generate an additional observed matrix $R_{xx}'$.

In the additional observed matrix $R_{xx}'$, the effects of any correlation between the reflected radar waves from respectively separate target bodies are suppressed. Direction estimation by the MUSIC method is then performed, using the additional observed matrix $R_{xx}'$ (steps S200, S210 above).

Hence with the above embodiment, direction estimation using the MUSIC algorithm can be performed irrespective of the speed of the local vehicle. It thereby becomes possible to accurately detect the respective directions of a plurality of separate target bodies, irrespective of the speed of the local vehicle.

It can thus be understood that with the present invention, even if each of the local vehicle and target bodies are halted, correlation between respective radar waves that are received by reflection from the target bodies can be suppressed, in a correlation matrix which is used with a null-scan type of algorithm such as MUSIC for executing direction detection. Effective detection of the respective directions of one or more target bodies can thereby be achieved.

Other Embodiments

With the first embodiment described above, direction estimation is performed by using only the MUSIC algorithm (step S180 above) if the velocity V of the local vehicle is greater than the threshold value Vth. However it would be equally possible to instead always execute the steps S190 to S210 (i.e., DBF processing followed by MUSIC processing) irrespective of the velocity of the local vehicle. High accuracy of direction detection can thereby be achieved using only a single processing sequence. In that case, step S190 above would correspond to the approximate direction detection means that are recited in the appended claims, while step S210 above would correspond to the fine direction detection means. A flow diagram of the operation of such an alternative embodiment is shown in FIG. 6.

Furthermore with above embodiments, high-resolution direction detection (e.g., steps S180, S210) is executed using the MUSIC algorithm, while approximate direction detection (e.g., step S190) is executed by utilizing a main lobe of the antenna received signal pattern. However the invention is not limited to this. It would be equally possible, for example, for the high-resolution direction detection to be implemented by some other algorithm such as ESPRIT (Estimation of Signal Parameters via Rotational Invariance Techniques).

Furthermore with the above embodiments, the invention is described with respect to a pulse radar apparatus utilized as a direction detection apparatus. However the invention is equally applicable to use of a radar apparatus which transmits continuous radar waves, such as a FMCW (Frequency Modulation Continuous Wave) radar apparatus.

What is claimed is:

1. A direction detection apparatus installed on a vehicle, comprising a transmitting antenna for transmitting electromagnetic waves and an array antenna comprising a plurality of antenna elements, for receiving resultant reflected electromagnetic waves from each of one or more target bodies, said apparatus being configured to detect respective directions of said target bodies based on actual received signals obtained from said antenna elements, wherein said apparatus comprises:

first direction detection means responsive to said actual received signals for calculating an observed matrix expressing a correlation relationship between said actual received signals, and configured to perform said target body direction detection by applying a null scan form of direction detection algorithm to said observed matrix;

second direction detection means configured to detect said target body directions to a lower degree of resolution than for said first direction detection means, by utilizing a main lobe of a received signal pattern of said array antenna; and selector means configured to acquire a value of velocity of said vehicle and to select said first direction detection means to perform said target body direction detection when said velocity exceeds a predetermined threshold value, and to select said second direction detection means to perform said target body direction detection when said velocity does not exceed said threshold value.

2. A direction detection apparatus as claimed in claim 1, comprising:

quasi-observed matrix generating means configured to define a plurality of additional directions having said direction detected by said second direction detection means as a central direction, and to calculate a quasi-observed matrix expressing a correlation relationship between respective presumptive received signals which would be obtained from said antenna elements if said reflected waves were to be received along each of said additional directions; and third direction detection means, configured to derive an additional observed matrix by adding said quasi-observed matrix to said observed matrix, and to execute a direction detection algorithm that is identical to said direction detection algorithm which is executed by said first direction detection means, to thereby obtain said directions of said target bodies.

3. A direction detection apparatus as claimed in claim 2, wherein said quasi-observed matrix generating means is configured to calculate a plurality of quasi-received signal vectors respectively corresponding to said additional directions, calculate a plurality of correlation matrixes respectively based on said quasi-received signal vectors, and sum said plurality of correlation matrixes.

4. A direction detection apparatus installed on a vehicle, comprising a transmitting antenna for transmitting electromagnetic waves and an array antenna comprising a plurality of antenna elements for receiving resultant reflected electromagnetic waves from each of one or more target bodies, with respective actual received signals being thereby obtained from said antenna elements, said apparatus being configured to detect respective directions of said target bodies based on said received signals, wherein said apparatus comprises:

approximate direction detection means configured to detect an approximate direction of said target bodies by utilizing a main lobe of said array antenna;

quasi-observed matrix generating means configured to derive a plurality of additional directions centered on said approximate direction, and to generate a quasi-observed matrix expressing a correlation between respective presumptive received signals which would be obtained from said antenna elements if said reflected waves were to be received by said array antenna along said additional directions; and fine direction detection means configured to calculate an observed matrix which expresses a correlation relationship between said actual received signals, derive an additional observed matrix by adding said quasi-matrix to said observed matrix, and detect said directions of said target bodies to a higher detection resolution than said approximate direction detection means by applying said additional observed matrix to a null scan form of direction detection algorithm.

5. A method of detecting respective directions of one or more target bodies based upon received signals obtained by a plurality of antenna elements of an array antenna in response to incident reflected electromagnetic waves from said target bodies, said array antenna being installed on a vehicle, the method comprising:

calculating a first observed matrix, expressing a correlation relationship between said received signals;

acquiring a value of velocity at which said vehicle is currently travelling, and judging whether said velocity exceeds a predetermined threshold value;

when said velocity exceeds said threshold value, applying said first observed matrix to a null scan form of direction detection algorithm, for obtaining said respective directions;

when said velocity does not exceed said threshold value, calculating an approximate direction of said target bodies based upon a main lobe of a received signal pattern of said array antenna;

determining a plurality of additional directions that are centered on said approximate direction;

calculating a second observed matrix, expressing a correlation relationship between presumptive received signals which would be received from said antenna elements if said reflected electromagnetic waves were to be received along each of said additional directions;

adding said second observed matrix to said first observed matrix to obtain an additional observed matrix; and applying said first observed matrix to said null scan form of direction detection algorithm, for obtaining said respective directions.

6. A method of direction detection as claimed in claim 5, wherein said step of calculating said second observed matrix comprises steps of:

calculating a plurality of quasi-received signal vectors respectively corresponding to said additional directions, calculating a plurality of correlation matrixes respectively based on said quasi-received signal vectors, and summing said correlation matrixes.

7. A method of detecting respective directions of one or more target bodies based upon received signals obtained by a plurality of antenna elements of an array antenna in response to incident reflected electromagnetic waves from said target bodies, said array antenna being installed on a vehicle, the method comprising:

calculating a first observed matrix, expressing a correlation relationship between said received signals;

calculating an approximate direction of said target bodies based upon a main lobe of a received signal pattern of said array antenna;

determining a plurality of additional directions that are centered on said approximate direction;

calculating a second observed matrix, expressing a correlation relationship between presumptive received signals which would be received from said antenna elements if said reflected electromagnetic waves were to be received along each of said additional directions;

adding said second observed matrix to said first observed matrix to obtain an additional observed matrix; and applying said additional observed matrix to a null scan form of direction detection algorithm, for obtaining said respective directions.

8. A method of direction detection as claimed in claim 7, wherein said step of calculating said second observed matrix comprises steps of:

calculating a plurality of quasi-received signal vectors respectively corresponding to said additional directions, calculating a plurality of correlation matrixes respectively based on said quasi-received signal vectors, and summing said plurality of correlation matrixes.

* * * * *